United States Patent
Karode (10) Patent No.: US 11,318,412 B2
(45) Date of Patent: May 3, 2022

(54) GAS SEPARATION MEMBRANE MODULE WITH MEMBRANE ELEMENTS ARRANGED IN SERIES

(71) Applicant: Advanced Liquide Advanced Technologies U.S. LLC, Houston, TX (US)

(72) Inventor: Sandeep K. Karode, Boothwyn, PA (US)

(73) Assignee: Air Liquide Advanced Technologies U.S. LLC, Houston, TX (US)

(*) Notice: Subject to any disclaimer, the term of this patent is extended or adjusted under 35 U.S.C. 154(b) by 160 days.

(21) Appl. No.: 16/724,157

(22) Filed: Dec. 20, 2019

(65) Prior Publication Data
US 2020/0197859 A1 Jun. 25, 2020

Related U.S. Application Data

(60) Provisional application No. 62/784,407, filed on Dec. 22, 2018.

(51) Int. Cl.
*B01D 53/22* (2006.01)
*B01D 69/08* (2006.01)

(52) U.S. Cl.
CPC .......... *B01D 53/226* (2013.01); *B01D 69/08* (2013.01); *B01D 2257/504* (2013.01); *B01D 2257/7025* (2013.01); *B01D 2313/20* (2013.01); *B01D 2313/24* (2013.01); *B01D 2325/20* (2013.01)

(58) Field of Classification Search
CPC ...... B01D 2257/7025; B01D 2257/504; B01D 53/226; B01D 69/08; B01D 2313/24; B01D 2325/20; B01D 2313/20
See application file for complete search history.

(56) References Cited

U.S. PATENT DOCUMENTS

| | | | |
|---|---|---|---|
| 4,451,369 A | 5/1984 | Sekino et al. | |
| 4,670,145 A * | 6/1987 | Edwards | B01D 53/22 210/321.87 |
| 5,041,220 A * | 8/1991 | Lee | B01D 63/024 210/321.8 |
| 5,071,552 A * | 12/1991 | Bikson | B01D 63/025 210/321.8 |
| 5,470,469 A * | 11/1995 | Eckman | B01D 63/02 210/321.8 |
| 5,851,267 A * | 12/1998 | Schwartz | B01D 65/00 96/7 |
| 6,214,232 B1 | 4/2001 | Baurmeister et al. | |
| 7,790,030 B2 * | 9/2010 | Schwartz | B01D 63/12 210/323.1 |
| 7,918,921 B2 * | 4/2011 | Wynn | B01D 53/22 95/45 |

(Continued)

FOREIGN PATENT DOCUMENTS

WO WO-2006044255 A2 * 4/2006 ............. B01D 63/04

OTHER PUBLICATIONS

International Search Report and Written Opinion for corresponding PCT/US2019/067512, dated Mar. 26, 2020.

*Primary Examiner* — Anthony R Shumate
(74) *Attorney, Agent, or Firm* — Christopher J. Cronin (57) ABSTRACT

A plurality of membrane elements are arranged in series within a pressure vessel in which at least two of the elements exhibit different permeances or selectivities for a gas or gas pair respectively.

13 Claims, 3 Drawing Sheets

(56) References Cited

U.S. PATENT DOCUMENTS

| | | | | |
|---|---|---|---|---|
| 8,034,241 B2* | 10/2011 | Beppu | .................... | B01D 63/12 |
| | | | | 210/321.74 |
| 8,540,876 B2* | 9/2013 | Poklop | .................. | B01D 69/04 |
| | | | | 210/321.8 |
| 9,579,606 B2 | 2/2017 | Karode et al. | | |
| 9,737,857 B2 | 8/2017 | Karode et al. | | |
| 2009/0220008 A1 | 1/2009 | Wynn | | |
| 2011/0024342 A1* | 2/2011 | Fujita | .................. | B01D 71/028 |
| | | | | 210/184 |
| 2011/0174713 A1* | 7/2011 | Shelby | ................ | B01D 63/043 |
| | | | | 210/232 |
| 2012/0322119 A1* | 12/2012 | Liu | ...................... | B01D 53/228 |
| | | | | 435/161 |
| 2014/0283683 A1* | 9/2014 | Oguro | .................. | B01D 63/066 |
| | | | | 95/45 |
| 2017/0001150 A1 | 1/2017 | Kulkarni et al. | | |
| 2017/0080381 A1 | 3/2017 | Bocciardo et al. | | |
| 2017/0157556 A1* | 6/2017 | Karode | ................. | B01D 71/56 |
| 2018/0361310 A1 | 12/2018 | Karode et al. | | |
| 2019/0060835 A1* | 2/2019 | Ding | ................... | B01D 53/002 |

* cited by examiner

GAS SEPARATION MEMBRANE MODULE WITH MEMBRANE ELEMENTS ARRANGED IN SERIES

CROSS-REFERENCE TO RELATED APPLICATIONS

This application claims the benefit of U.S. Provisional Application No. 62/784,407, filed Dec. 22, 2018.

BACKGROUND

Field of the Invention

The present invention relates to gas separation membranes.

Related Art

Membranes are commonly used for large scale fluid (water or gas) separation processes. Gas separation membranes are commonly manufactured in one of two configurations: flat sheet or hollow fiber. The flat sheets are typically combined into a spiral wound element. On the other hand, the hollow fibers are commonly bundled together in a manner similar to a shell and tube heat exchange or they are wrapped around a mandrel.

In typical spiral wound flat sheet membranes, two flat sheets of membrane with a permeate spacer in between are joined, for example glued, along three of their sides to form an envelope (i.e., a "leaf") that is closed on three sides but open on one side. These envelopes are separated by feed spacers and wrapped around or otherwise to form a perforated permeate tube with the open side of the envelope facing the permeate tube. Feed gas enters along one side (i.e., the feed gas side) of the wound membrane element in between two adjacent envelopes and passes through the membrane element in an axial direction. As the gas travels between adjacent envelopes, more permeable fluids permeate through one of the sheets and into an interior of the envelope. These permeated gases have only one available outlet (the single open side of the envelope), so they travel within the envelope in an inwardly spiraling path, out the open envelope side, and to the permeate tube. The primary driving force for such transport (from the feed side to the permeate tube) is the pressure differential between the high feed gas pressure and the low permeate gas pressure. The permeate gas enters the permeate tube, such as through perforations formed in the tube. The gases that do not permeate the sheet are referred to as the non-permeate gas (or residue or retentate). The non-permeate completes travel through the spiral wound sheet in the axial direction and exits the side of the membrane element opposite that of the feed gas side.

In hollow fiber elements, very small hollow fibers are laid around a central tube either arranged parallel to the axis of the tube or helically wrapped around the tube. This achieves a fairly high packing density. In one type of hollow fiber membrane, the bores of the fibers at one end thereof are sealed off from the feed gas with a tubesheet at one end of the membrane element. In another type of hollow fiber membrane, the bores of the fibers at each end thereof are sealed off from the feed gas with a tubesheet at each end of the membrane element. Feed gas is fed to the outer circumferential surface of the membrane element and flows over and between the fibers. More permeable gases permeate across the fiber wall into the fiber bores. The permeate gas then travels within the fiber and is collected at the tubesheet(s). When two or more membrane elements are arranged in parallel, the permeate gas from one membrane element is mixed with the permeate gases from the other membrane elements. Typically, the combined permeate gas exits the membrane element through a permeate conduit or pipe. Gases not permeating through the fiber wall eventually reach a central tube of the membrane element, which is typically perforated. While many configurations for the permeate conduit have been proposed, in one such configuration, the central tube is divided into two regions extending throughout the entirety of the central tube. In such a divided region tube, the non-permeate gas is conveyed in the outer region while the permeate gas is conveyed in the inner region. The inner region is sealed off from the outer region but fluidly communicates with a permeate gas collection element formed in the tubesheet.

Regardless of whether the membranes are configured as hollow fibers or spiral wound flat sheets, typically the membranes are arranged within a pressure vessel that includes a feed port, a permeate port, and a retentate port. As the name suggests, feed gas is fed to the membranes within the pressure vessel via the feed port, permeate gas is withdrawn from the permeate port, and retentate gas is withdrawn from the retentate port.

One well-known application of gas separation modules is the separation of $CO_2$ from natural gas. In such an application or for similar large-flow separation processes, the customer (i.e., a natural gas company) solicits bids from gas separation module suppliers for a large number (on the order of hundreds, for example) of gas separation modules for integration into the customer process. Because the customer's process is often a complex, multi-step purification and conditioning process (such as the purification of raw natural gas to pipeline specifications), the overall customer process is designed with the particular characteristics of the gas separation modules of the winning bid in mind. Those characteristics typically include the length and inside diameter dimensions of the pressure vessel, the inner diameter and outer diameter dimensions of the flanges associated with the feed, permeate, and retentate ports, and the particular way in which the flanges mate with, and are secured to, the corresponding flanges of the upstream and downstream portions of the customer process connected to the gas separation modules.

It is known that membrane performance can deteriorate over time and deleteriously affect the customer's process. The flux and/or selectivity of the membranes may decrease to below the contractually agreed-upon specifications with the result that the product gas purity and/or production rate may unsatisfactorily decrease. For example, and in the instance of removal of $CO_2$ from natural gas, the $CO_2$ level of the product natural gas may exceed a predetermined maximum, the BTU value of the product natural gas may fall below a predetermined minimum, or the production rate of the product natural gas (in terms of BTU per unit time) may fall below a predetermined threshold. When the membrane performance deteriorates, two solutions are potentially available.

In the first solution, replacement of each of the gas separation modules is solicited by the customer. This solution is often considered disadvantageous for the reason that many (if not all) of the alternative and commercially available gas separation modules may be incompatible with the customer's process because one or more of the aforementioned dimensions of the pressure vessels and flanges do not match those of the originally installed modules. For example, the flanges of existing headers (whether for feed gas, permeate gas, or retentate gas) from or to the customer's process that connect to several gas separation modules must meet up perfectly with the flanges of those modules. Because each gas separation module supplier production typically limits their commercial offering to only a relatively low number of different gas separation module configurations and membrane element types, it is not always possible for that supplier to provide replacement modules that are wholly compatible with the customer's process. The customer is then often faced with the undesirable outcome that the original supplier is the only potential supplier unless the customer wishes to engage in a costly and complicated retrofit of its process. This is clearly disadvantageous due to increased cost and process downtime reasons.

In the second solution, the customer solicits replacement of each of the deteriorated membrane elements within the pressure vessel with non-deteriorated membrane elements that are otherwise identical to those being replaced. Very small differences in the dimensions of the membrane elements, such as the length and outer diameter between the deteriorated membrane elements and the replacement membrane elements can result in unsatisfactory or even failed seals between the feed gas, permeate gas, and retentate gas. Also, very small differences in the dimensions of the internal tubing (i.e., permeate tube or feed gas tube) between the deteriorated membrane elements and the replacement membrane elements can similarly result in unsatisfactory or even failed seals. The customer is again often faced with the undesirable outcome that the original supplier is the only potential supplier unless a different gas separation module supplier wishes to engage in a costly and complicated retrofit of its own gas membrane elements so that no mismatches occur.

Problems associated with either of the aforementioned solutions can be exacerbated if the originally installed gas separation membrane modules are configured as spiral wound sheet-based membranes are replaced with hollow fiber-based membrane elements because the many structural differences between these two membrane configurations.

U.S. Pat. No. 9,737,857 B2 proposes a workaround to the disadvantages associated with replacement of the membrane elements (as opposed to replacement of the gas separation module). A deteriorated membrane element of a predetermined length is replaced with a plurality of replacement membrane elements, which when connected, are compatible with the overall length available with the pressure vessel and serve to meet or exceed the original performance characteristics of the now-deteriorated membrane. While this is a fully satisfactory solution, unfortunately the apparatus disclosed by U.S. Pat. No. 9,737,857 B2 is limited to a plurality of identical membrane elements in parallel flow configuration. In some circumstances, this limitation can be important. Take, for example, the situation where the now-deteriorated membrane element was originally designed to separate two different components from the feed gas sought to be purified. If the replacement membrane element is unable to simultaneously perform these two separations because it is made of a different material, the solution of U.S. Pat. No. 9,737,857 B2, as disclosed, cannot be used since it is directed to a parallel flow configuration utilizing identical membrane elements.

Therefore, it is an object of the invention to provide a solution to the above-described problem that does not suffer from the above-described drawbacks.

SUMMARY

There is disclosed a method in which a gas mixture that includes first and second gases may be separated with the gas separation membrane module. The gas separation membrane module comprising a pressure vessel, at least one feed gas inlet fluidly communicating with the interior of the pressure vessel, at least one permeate gas outlet fluidly communicating with the interior of the pressure vessel, at least one retentate gas outlet fluidly communicating with the interior of the pressure vessel, and a plurality of membrane elements disposed in series within the pressure vessel. Each of said plurality of membrane elements comprising a bundle of hollow fibers, which includes a plurality of membrane elements, wherein at a same concentration of the first gas, the first and second membrane elements exhibit different permeances for the first gas and/or different selectivities for the first gas over the second gas.

The gas mixture is fed to a gas separation membrane module. There may be one or more membrane elements disposed in series upstream of the first membrane element. In this case, the gas received by the first membrane element is the retentate gas from the adjacent upstream membrane element. When the first membrane element is the most upstream of all of the membrane elements, the gas received by the first membrane element is the gas mixture.

The gas fed to the first membrane element is separated with the first membrane element into a permeate gas and a retentate gas. The permeate gas produced by the first membrane element is enriched in the first gas and deficient in the second gas in comparison to the retentate gas produced by the first membrane element.

There may be one or more membrane elements disposed in series in between the first and second membrane elements. In this case, the gas fed to the second membrane element is the retentate gas from the adjacent upstream membrane element. When the second membrane element is adjacently downstream of the first membrane element, the gas fed to the second membrane element is the retenate gas from the first membrane element. The gas fed to the second membrane element is separated by that membrane element into a permeate gas and a retentate gas.

A retentate gas is withdrawn from the gas separation module. This retentate gas is the retentate gas produced by the downstream-most one of the plurality of membrane elements. Finally, a gas that is made up of a combination of all of the permeate gases from the plurality of membrane elements is withdrawn from the gas separation module.

The invention is distinguished in part by the fact that, at a same concentration of the first gas, the first and second membrane elements exhibit different permeances for the first gas and/or different selectivities for the first gas over the second gas.

There is also disclosed a gas separation membrane module, comprising a tubular pressure vessel, at least one feed gas inlet fluidly communicating into an interior of the pressure vessel, at least one permeate gas outlet fluidly communicating from an interior of the pressure vessel, and at least one retentate gas outlet fluidly communicating from an interior of the pressure vessel, and a plurality of membrane elements disposed in series within the pressure vessel, each of the plurality of membrane elements being configured as a plurality of hollow fibers, each of the plurality of membrane elements being adapted and configured for separation of a gas mixture comprising first and second gases, said plurality of membrane elements comprising first and second membrane elements, wherein the first and second membrane elements exhibit different permeances for the first gas and different selectivities for the first gas over the second gas.

The method or membrane module may include one or more of the following elements:

the first gas is a $C_n$ olefin; the second gas is a $C_n$ paraffin; n is 2 or 3; and for a same concentration of olefin fed either to the first membrane element or the second membrane element, the first membrane element exhibits a higher $C_n$ olefin permeance than does the second membrane element.

the first gas is $CO_2$; the second gas is $CH_4$, and at a same concentration of $CO_2$ fed to either the first membrane element or the second membrane element, the first membrane element exhibits a higher $CO_2$ permance than does the second membrane element.

the gas mixture further comprises a third gas; the permeate gas produced by the first membrane element is enriched in the third gas in comparison to the retentate gas produced by the first membrane element; the first membrane element exhibits a higher permeance for the third gas in comparison to the second membrane element; and the first membrane element exhibits a higher selectivity for the third gas over the second gas in comparison to the second membrane element.

the first gas is a $C_{3+}$ hydrocarbon, the second gas is $CH_4$, and the third gas is $CO_2$; the second membrane element exhibits a higher permeance for the first gas in comparison to the first membrane element; and the second membrane element exhibits a higher selectivity for the first gas over the second gas in comparison to the first membrane element.

the first gas is $CO_2$, the second gas is $CH_4$, and the third gas is $H_2S$; the second membrane element exhibits a higher permeance for the first gas in comparison to the first membrane element; and the second membrane element exhibits a higher selectivity for the first gas over the second gas in comparison to the first membrane element.

the gas mixture further comprises a fourth gas, the fourth gas being a $C_{3+}$ hydrocarbon; the first membrane element has a higher selectivity of the fourth gas over the second gas in comparison to the second membrane element; and the first membrane element has a greater permeance of the fourth gas in comparison to the second membrane element.

the first gas is $CO_2$, the second gas is $CH_4$, the third gas is $H_2S$ and the gas mixture further comprises one or more $C_3+$ hydrocarbons.

the gas mixture further comprises a third gas; the first gas is $CO_2$; the second gas is $CH_4$, the third gas is a $C_3+$ hydrocarbon; the permeate gas produced by the second membrane element is enriched in the third gas in comparison to the retentate gas produced by the second membrane element; the second membrane element exhibits a higher permeance for the third gas in comparison to the first membrane element; the second membrane element exhibits a higher selectivity for the third gas over the second gas in comparison to the first membrane element.

the first membrane element exhibits a higher permeance for the first gas in comparison to the second membrane element and the second membrane element exhibits a higher selectivity for the first gas over the second gas in comparison to the first membrane element.

the gas mixture is natural gas.

the gas mixture is associated gas.

said plurality of membrane elements essentially consists of a first membrane element upstream of a second membrane element.

the first membrane element comprises a plurality of hollow fiber membranes each of which comprises a separation layer made of a polymer according to formula I:

wherein each PA is independently an aliphatic polyamide and each PE is independently one of tetramethylene oxide, propylene oxide, and ethylene oxide; and the second membrane element comprises a plurality of hollow fiber membranes each of which comprises a separation layer made of a polyimide.

one of the first and second membrane elements comprises a plurality of hollow fiber membranes each of which comprises a separation layer made of a first polymeric material; the other of the first and second membrane elements comprises a plurality of hollow fiber membranes each of which comprises a separation layer made of a second polymeric material; the first polymeric material is a polyimide; the second polymeric material is an amorphous perfluoropolymer; and the first membrane element exhibits a higher permeance for the first gas in comparison to the second membrane element;

the second membrane element exhibits a higher selectivity for the first gas over the second gas in comparison to the first membrane element.

each of the first and second hollow fiber membrane elements is selective for $C_n$ olefins over a corresponding $C_n$ paraffin where n is 2 or 3, each of the hollow fibers of the first membrane element includes a separation layer made of a first polymeric material, each of the hollow fibers of the second hollow fiber membrane element includes a separation layer made of a second polymeric material that is chemically distinct from the first polymeric material, and for exposure to a same concentration of $C_n$ olefin, the first polymeric material exhibits a higher $C_n$ olefin permeance than does the second polymeric material.

each of the first and second hollow fiber membrane elements is selective for $CO_2$ over $CH_4$, each of the hollow fibers of the first membrane element includes a separation layer made of a first polymeric material, each of the hollow fibers of the second hollow fiber membrane element includes a separation layer made of a second polymeric material that is chemically distinct from the first polymeric material, and at a same concentration of $CO_2$, the first polymeric material exhibits a higher $CO_2$ permeance than does the second polymeric material.

the gas mixture, that each of the plurality of membrane elements are adapted and configured to separate, further comprises a third gas; and each of the first and second membrane elements are selective for the first gas over the second gas and also are selective for the third gas over the second gas.

the first gas is a $C_{3+}$ hydrocarbon, the second gas is $CH_4$, and the third gas is $CO_2$; the second membrane element exhibits a higher permeance for the first gas in comparison to the first membrane element; and the second membrane element exhibits a higher selectivity for the first gas over the second gas in comparison to the first membrane element.

the first gas is $CO_2$, the second gas is $CH_4$, and the third gas is $H_2S$; the second membrane element exhibits a higher permeance for the first gas in comparison to the first membrane element; and the second membrane element exhibits a higher selectivity for the first gas over the second gas in comparison to the first membrane element.

the gas mixture, that each of the plurality of membrane elements are adapted and configured to separate, further comprises a fourth gas, the fourth gas being a $C_{3+}$ hydrocarbon; the first membrane element has a higher selectivity of the fourth gas over the second gas in comparison to the second membrane element; and the first membrane element has a greater permeance of the fourth gas in comparison to the second membrane element.

the gas mixture, that each of the plurality of membrane elements are adapted and configured to separate, further comprises a third gas; each of the plurality of membrane elements is selective for the first gas over the second gas and also for the third gas over the second gas; the first gas is $CO_2$; the second gas is $CH_4$, the third gas is a $C_{3+}$ hydrocarbon; the second membrane element exhibits a higher permeance for the third gas in comparison to the first membrane element; and the second membrane element exhibits a higher selectivity for the third gas over the second gas in comparison to the first membrane element.

the first membrane element exhibits a higher permeance for the first gas in comparison to the second membrane element and the second membrane element exhibits a higher selectivity for the first gas over the second gas in comparison to the first membrane element.

the plurality of membrane elements are arranged in series within the pressure vessel along an axis of the pressure vessel; and each of the membrane elements comprises a perforated outer tube concentrically disposed within the pressure vessel and extending along the pressure vessel axis, a permeate tube concentrically disposed within the perforated outer tube and extending therethrough along the pressure vessel axis, a bundle of hollow fibers disposed around the respective outer tube, a mass of cured resin material sealing upstream ends of the hollow fibers thereby forming a nub, a tubesheet formed around downstream open ends of the respective hollow fibers and having at least one channel formed therein that fluidly communicates with downstream ends of the respective hollow fibers, a permeate passageway fluidly communicating between the tubesheet channels and the permeate tube and being sealed from flows of feed gas or retentate gas, an annular retentate gas space disposed between an inner surface of the respective outer tube and an outer surface of the respective permeate tube, and a seal between an outer circumferential surface of the tubesheet and an adjacent inner surface of the pressure vessel preventing a flow of gas therethrough.

each of a plurality of annular feed gas spaces is disposed between an inner surface of the pressure vessel and an outer circumferential region of the bundle of hollow fibers of a respective one of the plurality of membrane elements so as to allow a flow of gas between the inner surface of the pressure vessel and the respective one of the plurality of membrane elements; upstream ends of each of the annular retentate gas spaces are sealed so that any flow of gas cannot enter from an upstream end thereof unless such gas first flows across the bundle of hollow fibers of the respective membrane element; the at least one feed gas inlet is in upstream flow communication with the annular feed gas space of an upstream-most one of the plurality of membrane elements; the annular retentate gas space of a downstream-most one of the plurality of membrane elements is in upstream flow communication with the at least one retentate gas outlet; each of the permeate tubes of the plurality of membrane elements is sealingly connected to one another to form a single, integrated permeate tube; and at least one end of the single integrated permeate tube is in flow communication with a respective one of the one or more permeate gas outlets.

said plurality of membrane elements essentially consists of a first membrane element upstream of a second membrane element.

each of the hollow fibers of the first membrane element comprises a separation layer made of a polymer according to formula I:

wherein each PA is independently an aliphatic polyamide and each PE is independently one of tetramethylene oxide, propylene oxide, and ethylene oxide; and each of the hollow fibers of the second membrane element comprises a separation layer made of a polyimide.

each of the hollow fiber membranes of one of the first and second membrane elements comprises a separation layer made of a first polymeric material; each of the hollow fiber membranes of the other of the first and second membrane elements comprises a separation layer made of a second polymeric material; the first polymeric material is a polyimide; the second polymeric material is an amorphous perfluoropolymer; the first membrane element exhibits a higher permeance for the first gas in comparison to the second membrane element; and the second membrane element exhibits a higher selectivity for the first gas over the second gas in comparison to the first membrane element.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

LIST OF REFERENCE CHARACTERS

1: feed gas inlet
3: pressure vessel
5: permeate outlet
7: retentate outlet
11: feed flow to first membrane element
13: first membrane element
15: permeate flow from first membrane element
17: retentate flow from first membrane element and also feed flow to second membrane element
19: second membrane element 21: permeate flow form second membrane element
23: retentate flow from second membrane element and also feed flow to third membrane element
25: third membrane element
27: permeate flow from third membrane element
29: retentate flow from third membrane element
31: pressure vessel
32: annular feed gas space
33: perforated outer tube
34: annular retentate gas space
35: permeate tube
36: interior of permeate tube
37: bundle of hollow fiber membranes
38: annular gap
39: nub
41: first half of tubesheet
43: second half of tubesheet
45: mechanical fastener
47: seal
49: gas-tight seal
64: permeate passageway
65: retentate gas

DESCRIPTION OF PREFERRED EMBODIMENTS

The hollow fiber-based gas separation membrane module of the invention has a tremendous amount of flexibility for providing solutions for various gas separations by allowing different types of membrane elements with different gas separation performance properties that are arranged in series within a single pressure vessel. Thus, the gas separation membrane module of the invention is not limited to a single membrane element of a single type or even multiple membrane elements of a same type within a same pressure vessel as is found in conventional gas separation modules.

Figure 1A:
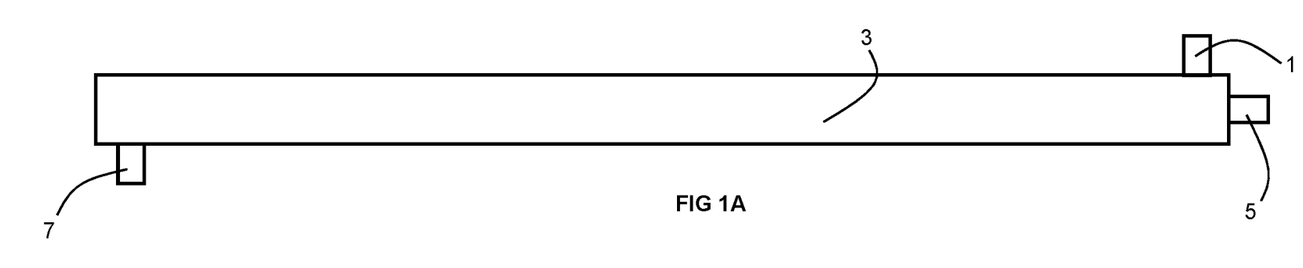
FIG. 1A is an elevation view of a membrane module with one permeate outlet disposed at a same end as a feed gas inlet port.
Figure 1B:
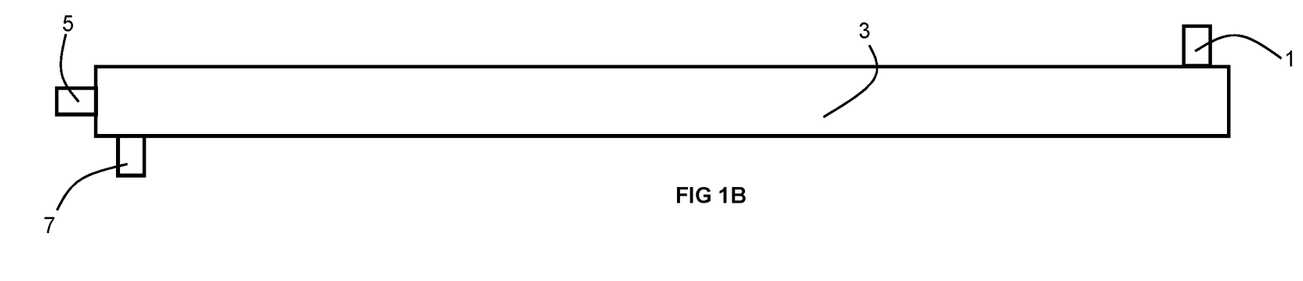
FIG. 1B is an elevation view of a membrane module with one permeate outlet disposed at a different end as a feed gas inlet port.
Figure 1C:
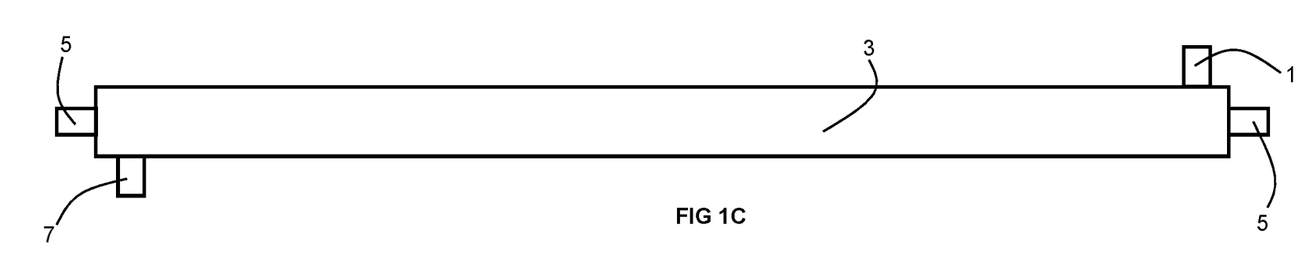
FIG. 1C is a cross-sectional elevation view of an embodiment of a membrane module according with two permeate outlet ports.

As best illustrated in FIGS. 1A-1C, the gas separation module includes a pressure vessel having one or more feed gas inlets, one or more permeate gas outlets, and one or more retentate gas outlets, each of which fluidly communicate with a respective interior portion of the pressure vessel. The invention is not limited to the particular configurations and number of feed gas inlets, permeate gas outlets, and retentate gas outlets illustrated in FIGS. 1A-1C but may include any known in the field of gas separation membranes. The gas separation module includes one or more membrane elements arranged in series. By "arranged in series", I mean that the feed gas for each membrane element is the retentate from the adjacent, upstream membrane element. Of course, this does not apply to the most upstream membrane element because it receives its feed gas from the feed gas inlet. The gas separation membrane module has a plurality of membrane elements, typically, 2-5 membrane elements. Each of the membrane elements includes a bundle of hollow fibers membranes.

The gas separation module includes a plurality of membrane elements that are used to separate a gas mixture that includes at least first and second gases.

Figure 2:
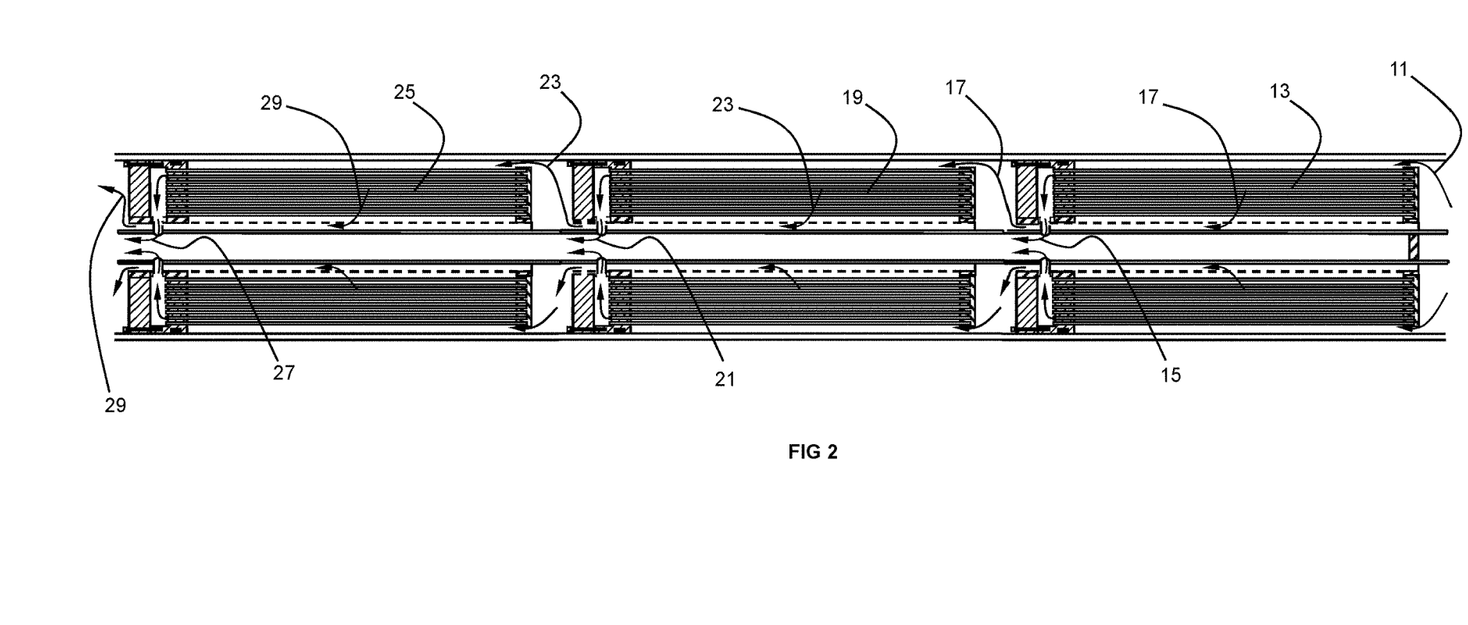
FIG. 2 is a cross-sectional elevation view with parts removed of an embodiment of a membrane module according to the invention showing permeate and retentate flows for each of three membrane elements.

In an embodiment shown in FIG. 2, the gas separation membrane module includes first, second, and third membrane elements 13, 19, 25. A feed gas is received by one or more feed gas inlets (not shown) of the module and a flow 11 of the feed gas is channeled across the first membrane element 13 in a radial direction from the outer surface thereof towards an axis of the module.

The membrane elements are based upon hollow fiber membranes. The hollow fiber membranes may be configured as monolithic, asymmetric hollow fibers which are spun from a single polymeric composition, in which case the gas separation properties of ultra-thin, dense skin layer (i.e., the separation layer) on the outside of the fiber dictate in large part the gas separation properties (permeance and selectivity) of the membrane elements as a whole. The hollow fiber membranaes may instead be configured as composite hollow fibers which have a separation layer disposed over a support layer in which case the primary functions of the support layer are to provide strength to the fiber and to provide a highly porous material to channel permeated gas away from the separation layer and into the bore of the fiber. The support layer ordinarily does not substantially participate in the gas separation at hand, but may optionally be made of a polymer that exhibits satisfactorily significant gas separation properties for the gas separation at hand. Composite fibers may either be co-extruded from a spinneret from two or more polymeric compositions or extruded from a spinneret as a monolithic hollow fiber from one polymeric composition and subsequently coated with another polymeric composition. In this latter case, the coating becomes the separation layer which in large part dictates the gas separation performance properties of the membrane element.

Gases in the feed gas 11 that permeate relatively faster across the separation layer of the hollow fiber membranes become enriched in the bores of the hollow fibers while gases that permeate relatively slower across the separation layer continue to flow across the membrane element 11, in a radial direction, in between fibers and become enriched in an annulus adjacent the middle (with respect to the radial direction) of the membrane element forming an annular flow of rentate gas 17. The permeate gas from each of the bores of the hollow fibers are collected at open, downstream ends of those bores as a flow of permeate gas 15 and subsequently channeled into a permeate tube in a middle (again, with respect to the radial direction) of the module. In the foregoing manner, the gas mixture fed to the gas separation module is separated by the first membrane element into a flow of permeate gas 15 and a flow of retentate gas 17.

The flow of retentate gas 17 exits the annular space downstream of the first membrane element 11 and serves as the feed gas 17 for the second membrane element 19. Similar to the first membrane element 13, the feed gas 17 flows across the second membrane element 19 in a radial direction. Gases in the feed gas 17 that permeate relatively faster across the separation layer of the hollow fiber membranes become enriched in the bores of the hollow fibers while gases that permeate relatively slower across the separation layer continue to flow across the membrane element 19, in a radial direction, in between fibers and become enriched in an annulus adjacent the middle (with respect to the radial direction) of the membrane element forming an annular flow of rentate gas 23. Also, the permeate gas from the bores of the hollow fibers of the second membrane element 19 are collected from open, downstream ends of those bores as a flow of permeate gas 21 and channeled into a permeate tube in the middle (again, with respect to the radial direction) of the module. In the foregoing manner, the feed gas 17 is separated by the second membrane element 19 into a flow of permeate gas 21 and a flow of a retentate gas 23.

The flow of retentate gas 23 from the second membrane element 19 exits the annular space downstream of the seconed membrane element 19 and serves as the feed gas 23 for the third membrane element 25. Similar to the first and second membrane elements 13, 19, the feed gas 23 flows across the third membrane element 25 in a radial direction.

Gases in the feed gas 23 for the third membrane element 25 that permeate relatively faster across the separation layer of the hollow fiber membranes become enriched in the bores of the hollow fibers while gases that permeate relatively slower across the separation layer continue to flow, in a radial direction, across the membrane element 25 in between fibers and become enriched in an annulus adjacent the middle (with respect to the radial direction) of the membrane element forming an annular flow of rentate gas 29. Also, the permeate gas from the bores of the hollow fibers of the third membrane element 25 are collected from open, downstream ends of those bores as a flow of permeate gas 27 and is channeled into a permeate tube in the middle (again, with respect to the radial direction) of the module. In the foregoing manner, the feed gas 23 is separated by the third membrane element 25 into a flow of permeate gas 27 and a flow of a retentate gas 29.

The combined flows of permeate gas 17, 23, 27 flow out of the permeate tube and are withdrawn from the module via the permeate gas outlet. This combination is considered to be the permeate gas produced by the module as a whole. While the combined flows of permeate gases 17, 23, 27 are illustrated as flowing in co-flow fashion with respect to the flow of feed gases 11, 17, 23, this flow of the combined permeate gases 17, 23, 27 can instead flow in counter-flow fashion or it may flow in both axial directions towards ends of the module. One of ordinary skill in the art will recognize that the direction will be dictated by where the permeate gas outlet is located with respect to the permeate tube. In contrast to the permeate gas produced by the module as a whole, because of the staging scheme of the in-series arrangement of membrane elements 13, 19, 25, the annular flow of retentate gas 29 is withdrawn from the retentate gas outlet as a flow of retentate gas that is produced by the module as a whole.

Figure 3:
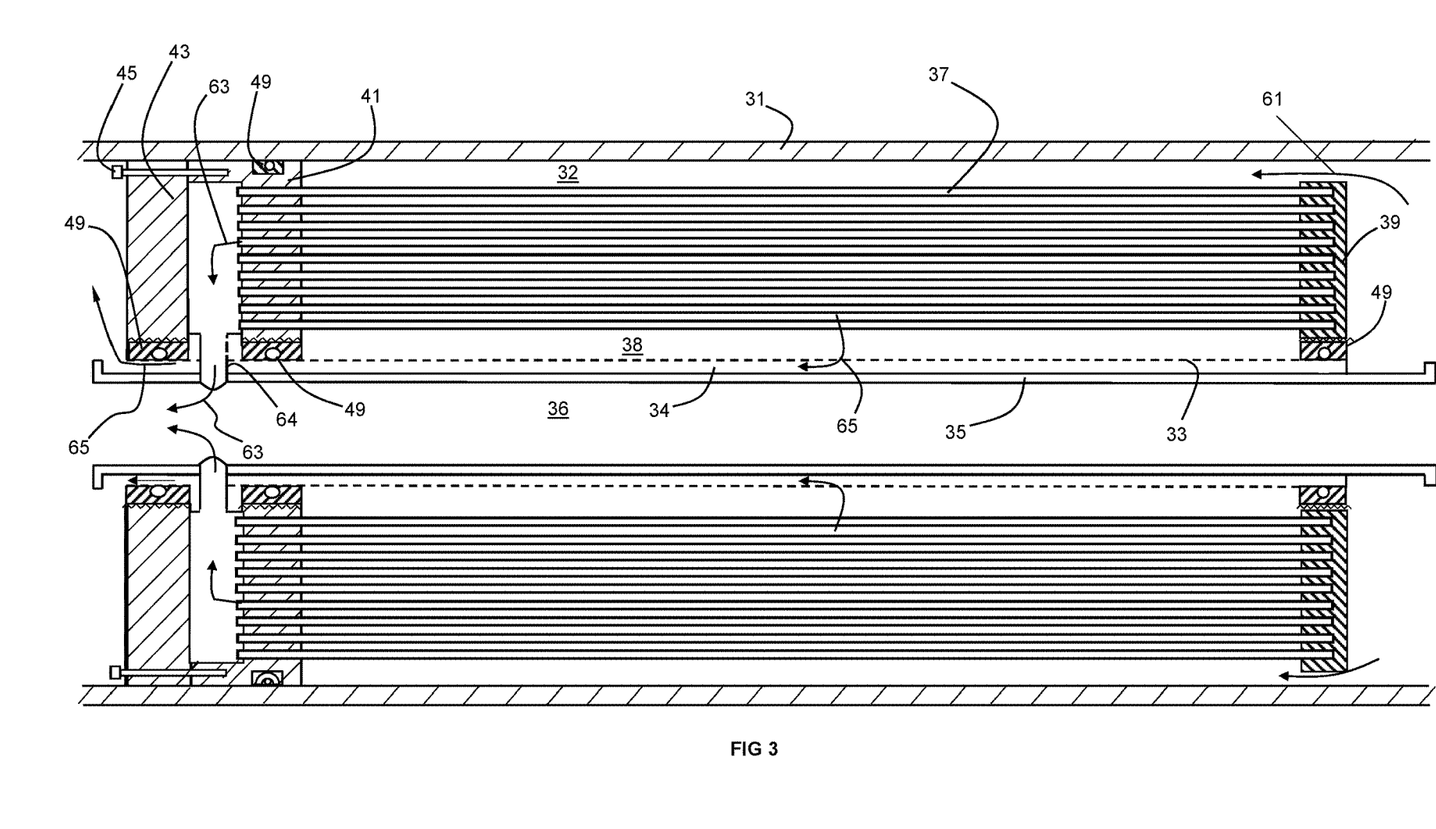
FIG. 3 is a cross-sectional elevation view with parts removed of an embodiment of a membrane module according to the invention showing structural features of one of the membrane elements.

The features of an exemplary embodiment of a membrane element within a tubular pressure vessel 31 is illustrated in FIG. 3.

The vessel 31 surrounds a coaxial perforated outer tube 33 that in turn surrounds a coaxial permeate tube 35. An annular retentate gas space 34 is defined between an inner surface of the outer tube 33 and an outer surface of the permeate tube 35. An annular bundle of hollow fiber membranes 37 is coaxially disposed between the pressure vessel 31 and the outer tube 33. An annular gap 38 is defined between an inner surface of the bundle 37 and an outer surface of the outer tube 33. An annular feed gas space 32 is defined between an inner surface of the pressure vessel 31 and an outer circumferential surface of the hollow fiber membrane bundle 37. Upstream ends of the hollow fibers are encapsulated within a nub 39 formed from a mass of cured resin material which also seals the bores of the fibers on the upstream end.

A gas-tight seal 49 is disposed between the outer tube 33 and the nub 39 so as to prevent any flow of feed gas directly into the annular gap 38 or the annular retentate gas space 34. The upstream end of the annular retentate gas space 34 is also sealed in gas-tight fasion, typically, by welding a plate at the upstream end of the outer tube 33 to the permeate tube 35. The permeate tube 35 is also adapted and configured to be fluidly connected to the permeate gas outlet (not illustrated in FIG. 3) in a gas-tight manner. Due to the presence of these gas-tight seals, the feed gas is forced to flow into the annular feed gas space 32 instead of into the annular retentate gas space 34 or into an interior 36 of the permeate tube 35.

While any seal used in conventional gas separation membrane modules may be used for seal 49, typically it is made up of an o-ring disposed within a cup seal as disclosed in U.S. Pat. No. 9,579,606. The outer circumferential surface of the illustrated seal is threaded so as to be threadedly engaged within a corresponding threaded inner surface of the nub 39. A gas-tight seal is formed in between the outer tube 33 and the nub 39 through the frictional engagement of the threaded outer cirumferential surface of the seal 49 with the threaded, inwardly disposed surface of the nub 39 and through the compression of the seal 49 against the outer surface of the outer tube 33.

While downstream ends of the hollow fibes are also encapsulated within a mass of cured resin forming half 41 of a tubesheet, in contrast to the upstream ends, the bores of the downstream ends of the hollow fibers are exposed. This is typically accomplished by first forming the half tubesheet 41 over the upstream ends of the fibers of the bundle 37 so as to plug the bores and subsequently machining away a portion of the downstream face of that half tubesheet 41 so as to expose the bores of the hollow fibers. A second half 43 of the tubesheet is then secured to the first half 41 with mechanical fasteners 45, leaving one or more channels in between the first and second halves 41, 43. Because the bores of the downstream ends of the fibers are exposed, the channel(s) fluidly communicates with the bores of the hollow fibers. A permeate passageway 64 fluidly connects the channel(s) with the permeate tube 35.

A gas-tight seal is formed in between first half 41 of the tubesheet and the pressure vessel 31 by presence of seal 47. A gas-tight seal is also formed in between outer portions of the first and second halves 41, 43 of the tubesheet through compression of the two by mechanical fastener 45. Moreover, a gas-tight seal is formed between, on one hand, the spaces in between each of the fibers of the bundle, and on the other hand, the channel(s) formed in the tubesheet through encapsulation of the outer surfaces of the downstream ends of the fibers of the bundle by the material of the first half 41 of the tubesheet.

Because of the presence of the aforementioned gas-tight seals, the feed gas from the annular feed gas space 32 is forced to flow in a generally radial direction over the fibers of the bundle 37. A permeate gas-depleted retentate gas 65 collects in the annular gap 38 after the feed gas flows through the bundle 37. This retentate gas 65 flows through apertures in the outer tube 33 and into the annular retentate gas space 34. Gas that has permeated across the walls of the fibers, and into the fiber bores, is collected as permeate gas in the channel(s) formed in the tubesheet. The permeate gas flows from the channel(s), through the permeate passageway 64 and into the permeate tube 35. Permeate gas from each of the other membrane elements in the gas separation module commingles with the permeate gas from the membrane element illustrated in FIG. 3 and is withdrawn from a permeate gas outlet (not illustrated). The permeate gas flows through the aforementioned path due to the presence of the gas-tight seals described above and because the permeate passageway 64 is fluidly connected to the permeate tube 35 in gas-tight fashion.

Those skilled in the art will recognize that the permeate passageway 64 does not block the entirety of the annular retentate gas space 34. Thus, the retentate gas 65 flows out of the open downstream end of the annular retentate gas space 34. Each of the membrane elements (whether only one or more than one) is configured similarly to the membrane element of FIG. 3. Thus, the retentate gas 65 becomes the feed gas for the adjacent, downstream element.

Each and every membrane element within the pressure vessel need not have different gas separation properties.

Rather, a minimum of two of the membrane elements differ in their gas separation properties. For example, for a pressure vessel containing first, second, and third membrane elements, the first and second membrane elements may be made of identical materials while the third membrane element is made of a different material(s) in comparison to the first and second membrane elements.

The different gas separation property includes but is not limited to one or more of permeance, permeability, resistance to plasticization, and selectivity.

While each of the membrane elements are illustrated as having hollow fibers that extend parallel to a main axis of the membrane element, the hollow fibers may be helically wound instead. The hollow fibers include a separation layer made of a material that exhibits greater permeance for some gases than others. The type of material for the separation layer of a given membrane element is chosen based upon the separation sought to be achieved. For example, a material exhibiting greater permeance for $CO_2$ over methane (i.e., selective for $CO_2$ over methane) may be useful for separation of $CO_2$ from natural gas. A gas which the membrane exhibits a relatively greater permeance for tends to permeate across the wall of the hollow fiber in comparison to a gas which the membrane exhibits a relatively lower permeance for. Thus, the first gas tends to be enriched in the permeated gas inside the bores of the hollow fibers and the second tends to be enriched on the outside of the hollow fibers and continues to flow over and in between the hollow fibers.

In operation, a gas mixture that includes first and second gases may be separated with the gas separation membrane module. The gas separation membrane module comprising a pressure vessel, at least one feed gas inlet fluidly communicating with the interior of the pressure vessel, at least one permeate gas outlet fluidly communicating with the interior of the pressure vessel, at least one retentate gas outlet fluidly communicating with the interior of the pressure vessel, and a plurality of membrane elements disposed in series within the pressure vessel. Each of said plurality of membrane elements comprising a bundle of hollow fibers, which includes a plurality of membrane elements, wherein at a same concentration of the first gas, the first and second membrane elements exhibit different permeances for the first gas and/or different selectivities for the first gas over the second gas.

The gas mixture is fed to a gas separation membrane module. There may be one or more membrane elements disposed in series upstream of the first membrane element. In this case, the gas received by the first membrane element is the retentate gas from the adjacent upstream membrane element. When the first membrane element is the most upstream of all of the membrane elements, the gas received by the first membrane element is the gas mixture.

The gas fed to the first membrane element is separated with the first membrane element into a permeate gas and a retentate gas. The permeate gas produced by the first membrane element is enriched in the first gas and deficient in the second gas in comparison to the retentate gas produced by the first membrane element.

There may be one or more membrane elements disposed in series in between the first and second membrane elements. In this case, the gas fed to the second membrane element is the retentate gas from the adjacent upstream membrane element. When the second membrane element is adjacently downstream of the first membrane element, the gas fed to the second membrane element is the retenate gas from the first membrane element. The gas fed to the second membrane element is separated by that membrane element into a permeate gas and a retentate gas.

A retentate gas is withdrawn from the gas separation module. This retentate gas is the retentate gas produced by the downstream-most one of the plurality of membrane elements. Finally, a gas that is made up of a combination of all of the permeate gases from the plurality of membrane elements is withdrawn from the gas separation module.

The invention is distinguished in part by the fact that, at a same concentration of the first gas, the first and second membrane elements exhibit different permeances for the first gas and/or different selectivities for the first gas over the second gas.

For a gas mixture including first and second gases, the first gas may be a $C_n$ olefin while the second gas is a $C_n$ paraffin and n is 2 or 3. In this example, for a same concentration of olefin fed either to the first membrane element or the second membrane element, the first membrane element exhibits a higher $C_n$ olefin permeance than does the second membrane element.

In another example of a gas mixture including first and second gases, the first gas is $CO_2$ the second gas is $CH_4$. In this example, at a same concentration of $CO_2$ fed to either the first membrane element or the second membrane element, the first membrane element exhibits a higher $CO_2$ permance than does the second membrane element.

The gas mixture may also include first, second, and third gases. In this example, the permeate gas produced by the first membrane element is enriched in the third gas in comparison to the retentate gas produced by the first membrane element. Also, the first membrane element exhibits a higher permeance for the third gas in comparison to the second membrane element. Finally, the first membrane element exhibits a higher selectivity for the third gas over the second gas in comparison to the second membrane element.

As one particular example, the first gas is a $C_{3+}$ hydrocarbon, the second gas is $CH_4$, and the third gas is $CO_2$. In this example, the second membrane element exhibits a higher permeance for the first gas in comparison to the first membrane element. Also, the second membrane element exhibits a higher selectivity for the first gas over the second gas in comparison to the first membrane element.

As another particular example, the first gas is $CO_2$, the second gas is $CH_4$, and the third gas is $H_2S$. In this example, the second membrane element exhibits a higher permeance for the first gas in comparison to the first membrane element. Also, the second membrane element exhibits a higher selectivity for the first gas over the second gas in comparison to the first membrane element.

The gas mixture may include first, second, third, and fourth gases. In this example, the first gas is $CO_2$, the second gas is $CH_4$, the third gas is $H_2S$, and the fourth gas is a $C_{3+}$ hydrocarbon. In this example, the first membrane element has a higher selectivity of the fourth gas over the second gas in comparison to the second membrane element. Also, the first membrane element has a greater permeance of the fourth gas in comparison to the second membrane element.

In another example of a gas mixture including at least three gases, the first gas is $CO_2$, the second gas is $CH_4$, the third gas is $H_2S$. In this example, the gas mixture also includes one or more $C_{3+}$ hydrocarbons.

In a particular example of a gas mixture, the first gas is $CO_2$, the second gas is $CH_4$, and third gas is a $C_{3+}$ hydrocarbon. In this example, the permeate gas produced by the second membrane element is enriched in the third gas in comparison to the retentate gas produced by the second membrane element. Also, the second membrane element exhibits a higher permeance for the third gas in comparison to the first membrane element. Finally, the second membrane element exhibits a higher selectivity for the third gas over the second gas in comparison to the first membrane element.

In one aspect, regardless of the number of gases in the gas mixture, the gas separation membrane module is characterized by having a first membrane element that exhibits a higher permeance for the first gas in comparison to a second membrane element thereof. Also, the second membrane element exhibits a higher selectivity for the first gas over the second gas in comparison to the first membrane element.

In another aspect, the gas mixture is natural gas or associated gas.

In another aspect, the plurality of membrane elements includes only two membrane elements: the first membrane element which is upstream of the second membrane element.

In one example, the first membrane element comprises a plurality of hollow fiber membranes each having a separation layer made of a polymer according to formula I:

wherein each PA is independently an aliphatic polyamide and each PE is independently one of tetramethylene oxide, propylene oxide, and ethylene oxide. Also, the second membrane element has a plurality of hollow fiber membranes each of which includes a separation layer made of a polyimide.

In another particular example, one of the first and second membrane elements includes a plurality of hollow fiber membranes each of which comprises a separation layer made of a first polymeric material and the other of the first and second membrane elements includes a plurality of hollow fiber membranes each of which comprises a separation layer made of a second polymeric material. In this example, the first polymeric material is a polyimide and the second polymeric material is an amorphous perfluoropolymer. Also, the first membrane element exhibits a higher permeance for the first gas in comparison to the second membrane element while the second membrane element exhibits a higher selectivity for the first gas over the second gas in comparison to the first membrane element.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A gas separation membrane module, comprising a tubular pressure vessel, at least one feed gas inlet fluidly communicating into an interior of the pressure vessel, at least one permeate gas outlet fluidly communicating from an interior of the pressure vessel, and at least one retentate gas outlet fluidly communicating from an interior of the pressure vessel, and a plurality of membrane elements disposed in series within the pressure vessel, each of the plurality of membrane elements being configured as a plurality of hollow fibers, each of the plurality of membrane elements being adapted and configured for separation of a gas mixture comprising first and second gases, said plurality of membrane elements comprising first and second membrane elements, wherein:
   the first and second membrane elements exhibit different permeances for the first gas and different selectivities for the first gas over the second gas;
   the plurality of membrane elements are arranged in series within the pressure vessel along an axis of the pressure vessel; and
   each of the membrane elements comprises a perforated outer tube concentrically disposed within the pressure vessel and extending along the pressure vessel axis, a permeate tube concentrically disposed within the perforated outer tube and extending therethrough along the pressure vessel axis, a bundle of hollow fibers disposed around the respective outer tube, a mass of cured resin material sealing upstream ends of the hollow fibers thereby forming a nub, a tubesheet formed around downstream open ends of the respective hollow fibers and having at least one channel formed therein that fluidly communicates with downstream ends of the respective hollow fibers, a permeate passageway fluidly communicating between the tubesheet channels and the permeate tube and being sealed from flows of feed gas or retentate gas, an annular retentate gas space disposed between an inner surface of the respective outer tube and an outer surface of the respective permeate tube, and a seal between an outer circumferential surface of the tubesheet and an adjacent inner surface of the pressure vessel preventing a flow of gas therethrough.

2. The gas separation membrane module of claim 1, wherein each of the first and second hollow fiber membrane elements is selective for $C_n$, olefins over a corresponding $C_n$, paraffin where n is 2 or 3, each of the hollow fibers of the first membrane element includes a separation layer made of a first polymeric material, each of the hollow fibers of the second hollow fiber membrane element includes a separation layer made of a second polymeric material that is chemically distinct from the first polymeric material, and for exposure to a same concentration of $C_n$, olefin, the first polymeric material exhibits a higher $C_n$, olefin permeance than does the second polymeric material.

3. The gas separation module of claim 1, wherein each of the first and second hollow fiber membrane elements is selective for $CO_2$ over $CH_4$, each of the hollow fibers of the first membrane element includes a separation layer made of a first polymeric material, each of the hollow fibers of the second hollow fiber membrane element includes a separation layer made of a second polymeric material that is chemically distinct from the first polymeric material, and at a same concentration of $CO_2$, the first polymeric material exhibits a higher $CO_2$ permeance than does the second polymeric material.

4. The gas separation module of claim 1, wherein:
the gas mixture, that each of the plurality of membrane elements are adapted and configured to separate, further comprises a third gas;
each of the first and second membrane elements are selective for the first gas over the second gas and also are selective for the third gas over the second gas.

5. The gas separation module of claim 4, wherein:
the first gas is a $C_{3+}$ hydrocarbon, the second gas is $CH_4$, and the third gas is $CO_2$;
the second membrane element exhibits a higher permeance for the first gas in comparison to the first membrane element; and
the second membrane element exhibits a higher selectivity for the first gas over the second gas in comparison to the first membrane element.

6. The gas separation module of claim 4, wherein the first gas is $CO_2$, the second gas is $CH_4$, and the third gas is $H_2S$;
the second membrane element exhibits a higher permeance for the first gas in comparison to the first membrane element; and
the second membrane element exhibits a higher selectivity for the first gas over the second gas in comparison to the first membrane element.

7. The gas separation module of claim 6, wherein the gas mixture, that each of the plurality of membrane elements are adapted and configured to separate, further comprises a fourth gas, the fourth gas being a $C_{3+}$ hydrocarbon;
the first membrane element has a higher selectivity of the fourth gas over the second gas in comparison to the second membrane element; and
the first membrane element has a greater permeance of the fourth gas in comparison to the second membrane element.

8. The gas separation module of claim 1, wherein:
the gas mixture, that each of the plurality of membrane elements are adapted and configured to separate, further comprises a third gas;
each of the plurality of membrane elements is selective for the first gas over the second gas and also for the third gas over the second gas;
the first gas is $CO_2$;
the second gas is $CH_4$;
the third gas is a $C_{3+}$ hydrocarbon;
the second membrane element exhibits a higher permeance for the third gas in comparison to the first membrane element;
the second membrane element exhibits a higher selectivity for the third gas over the second gas in comparison to the first membrane element.

9. The gas separation module of claim 1, wherein:
the first membrane element exhibits a higher permeance for the first gas in comparison to the second membrane element;
the second membrane element exhibits a higher selectivity for the first gas over the second gas in comparison to the first membrane element.

10. The gas separation module of claim 1, wherein:
each of a plurality of annular feed gas spaces is disposed between an inner surface of the pressure vessel and an outer circumferential region of the bundle of hollow fibers of a respective one of the plurality of membrane elements so as to allow a flow of gas between the inner surface of the pressure vessel and the respective one of the plurality of membrane elements;
upstream ends of each of the annular retentate gas spaces are sealed so that any flow of gas cannot enter from an upstream end thereof unless such gas first flows across the bundle of hollow fibers of the respective membrane element;
the at least one feed gas inlet is in upstream flow communication with the annular feed gas space of an upstream-most one of the plurality of membrane elements;
the annular retentate gas space of a downstream-most one of the plurality of membrane elements is in upstream flow communication with the at least one retentate gas outlet;
each of the permeate tubes of the plurality of membrane elements is sealingly connected to one another to form a single, integrated permeate tube; and
at least one end of the single integrated permeate tube is in flow communication with a respective one of the one or more permeate gas outlets.

11. The gas separation module of claim 1, wherein said plurality of membrane elements essentially consists of a first membrane element upstream of a second membrane element.

12. The gas separation module of claim 1, wherein:
each of the hollow fibers of the first membrane element comprises a separation layer made of a polymer according to formula I:

wherein each PA is independently an aliphatic polyamide and each PE is independently one of tetramethylene oxide, propylene oxide, and ethylene oxide; and
each of the hollow fibers of the second membrane element comprises a separation layer made of a polyimide.

13. The gas separation module of claim 1, wherein:
each of the hollow fiber membranes of one of the first and second membrane elements comprises a separation layer made of a first polymeric material;
each of the hollow fiber membranes of the other of the first and second membrane elements comprises a separation layer made of a second polymeric material;

the first polymeric material is a polyimide;
the second polymeric material is an amorphous perfluoropolymer;
the first membrane element exhibits a higher permeance for the first gas in comparison to the second membrane element;
the second membrane element exhibits a higher selectivity for the first gas over the second gas in comparison to the first membrane element.

* * * * *